United States Patent
Brown

(10) Patent No.: US 8,150,743 B2
(45) Date of Patent: Apr. 3, 2012

(54) METHOD AND APPARATUS FOR THE IDENTIFICATION OF PRODUCTS DISPLAYED IN MEDIA PROGRAMS

(76) Inventor: Gadge Brown, New York, NY (US)

( * ) Notice: Subject to any disclaimer, the term of this patent is extended or adjusted under 35 U.S.C. 154(b) by 1173 days.

(21) Appl. No.: 11/524,338

(22) Filed: Sep. 20, 2006

(65) Prior Publication Data

US 2007/0078774 A1    Apr. 5, 2007

Related U.S. Application Data

(60) Provisional application No. 60/718,936, filed on Sep. 20, 2005.

(51) Int. Cl.
G06Q 30/00 (2006.01)

(52) U.S. Cl. ............... 705/27.2; 705/26.1; 705/27.1; 725/60

(58) Field of Classification Search .......... 705/26, 705/27, 26.1–27.2; 725/1–8, 60
See application file for complete search history.

(56) References Cited

U.S. PATENT DOCUMENTS

| | | | |
|---|---|---|---|
| 6,615,408 B1 * | 9/2003 | Kaiser et al. ........... | 725/112 |
| 6,774,908 B2 | 8/2004 | Bates et al. | |
| 7,000,242 B1 | 2/2006 | Haber | |
| 7,010,501 B1 | 3/2006 | Roslak et al. | |
| 7,013,290 B2 | 3/2006 | Ananian | |
| 7,110,967 B1 | 9/2006 | Espenes et al. | |
| 2004/0122746 A1 * | 6/2004 | Charlier et al. ........... | 705/27 |

OTHER PUBLICATIONS

"Streaming Video Gets Technology Boost with e-Media's New Solutions Line-up" Business Editors, Technology Writers. Business Wire. New York: Dec. 11, 2000. p. 1. Retrieved via ProQuest on Nov. 7, 2011.*

* cited by examiner

*Primary Examiner* — Michael Misiaszek
(74) *Attorney, Agent, or Firm* — John J. Skinner, Jr.; Michelman & Robinson LLP

(57) ABSTRACT

A method and apparatus for the identification of products in a media program and making such products available for consumer purchase is presented. A consumer utilizes a "BeamBack" device to initiate a "screen grab" and thereby express interest in a placed and/or advertised product. An identifying marker is transmitted in response to the consumer's interest to a product web-site, where still images of the product are displayed upon linking of the identifying marker to another marker identifying the still image. The identifying marker can be transmitted to the consumer's "BeamBack" device, computer, or web-page or directly to the product's web-site.

9 Claims, 4 Drawing Sheets

METHOD AND APPARATUS FOR THE IDENTIFICATION OF PRODUCTS DISPLAYED IN MEDIA PROGRAMS

PRIOR PROVISIONAL APPLICATION

The present application claims the benefit of U.S. Provisional Application Ser. No. 60/718,936, filed Sep. 20, 2005, which is hereby incorporated by reference.

FIELD OF THE INVENTION

The present invention is directed to a method and apparatus for the identification and cataloguing of products displayed in visual and audio media (e.g., in television shows, movies, print advertisements, radio, and on-line) for later consumer purchasing, and more additionally, to a method and apparatus allowing for a consumer to express interest in and later purchase a product displayed in a media program through the use of a "BeamBack" device and web-site.

BACKGROUND OF THE INVENTION

Television remains the most effective method to reach a mass audience. However, with the rise of TiVo, DVRs, broadband and video games, and the consumer's new ability to fast forward through commercials, many advertisers are shifting focus away from traditional 30 second commercial spots and looking into other forums. Indeed, though such new abilities thrilled customers, it made traditional advertisers extremely nervous and, as such, it's becoming harder to sell media advertising based on time-slots and traditional Nielsen ratings. In addition, Networks have a harder time scheduling programs, as customers cherry pick what they want to see and when, time slots become less relevant.

This has led to virtual stagnation in ad spending on television and Networks therefore need to offer advertisers a variety of new ways to deliver their message, including product placement.

Accordingly, as more and more people skip commercials using such devices as mentioned above, product placement in television programs is a growing industry. However, the utility of product placement is currently limited to what products the consumer can recognize or what products have a brand name on them.

Nonetheless, more and more consumers will be making the choice to pull content towards them. The attitude of the youngest generation indicates the urgency at which television advertising needs to shift to a more targeted approach.

Thus, there is a need for a method by which the products shown in films, television programs, or print can be identified to the consumer and made available for convenient purchase.

SUMMARY OF THE INVENTION

Accordingly, the present invention is directed to a method and apparatus which allows consumers to identify products placed in television shows, movies, print advertisements or other media and later access a web-site for browsing and purchase of those products.

Thus, in a first embodiment, a potential consumer uses a "BeamBack" sending device to "capture" products or items the consumer is interested in. The sending device sends a signal to a media interface. The media interface, in response, transmits coding numbers correlating to the products placed or advertised. The transmitted coding numbers are received by the "BeamBack" web-site which maps those coding numbers to further coding numbers corresponding to stills containing the "captured" products or items. Thus, the consumer can be directed to a particular still image in a television program, film, or poster, by pressing a button on a sending device which causes a receiver device to return coded information about the still image or poster that the user is viewing.

Alternatively, in a second embodiment, the consumer can search on the "BeamBack" web-site database by specific product types. Once entered, all such products that were placed in the program will be listed. When the user clicks on that a specific product, the user will see the scene or scenes it appeared in.

In each embodiment, Consumers will also see a beauty shot of the product or item, with detailed info about the product or item.

To achieve such, an embodiment of a method of making a product publicized in a visual or audio media available to a consumer for purchase via a web-site comprises the steps of: utilizing a still image of the product corresponding to the product's publication in the visual or audio media; assigning a first identifying marker to the still image to identify the visual or audio media in which the product is published; assigning a second identifying marker to identify the time and place of the publication of the visual or audio media in which the product is published; linking the first identifying marker and the second identifying marker together to identify the product; displaying the product on the web-site; transmitting at least one of the first and second identifying markers to the web-site; and retrieving the second identifying marker by means of a "BeamBack" device.

To further achieve such, an embodiment of an apparatus for making a product publicized in a visual or audio media available to a consumer for purchase via a web-site comprises: a "BeamBack" device, for transmitting a signal corresponding to a "screen grab" of the publicized product; and an interface for reception of the signal transmitted by the "BeamBack" device, wherein an identifying marker corresponding to the time and place of publication of the product is transmitted upon reception of the signal transmitted by the "BeamBack" device, wherein a still image of the publicized product is made available on a web-site on the basis of the transmitted identifying marker, and wherein another identifying marker is used to correlate between the transmitted identifying marker and the still image of the publicized product.

The present invention, including its features and advantages, will become more apparent from the following detailed description with reference to the accompanying drawings.

DETAILED DESCRIPTION OF THE INVENTION

FIGS. 1 through 4 illustrate a method and apparatus through which a consumer can express interest in a placed or advertised product or item and later purchase such product or item through a web-site. The products and items can include, inter alia, clothing, accessories, cosmetics worn by the actors, furniture and all other props, wallpaper and paint on the walls, and even locations or destinations. Each product is entered into a searchable database on the web-site.

Figure 1:
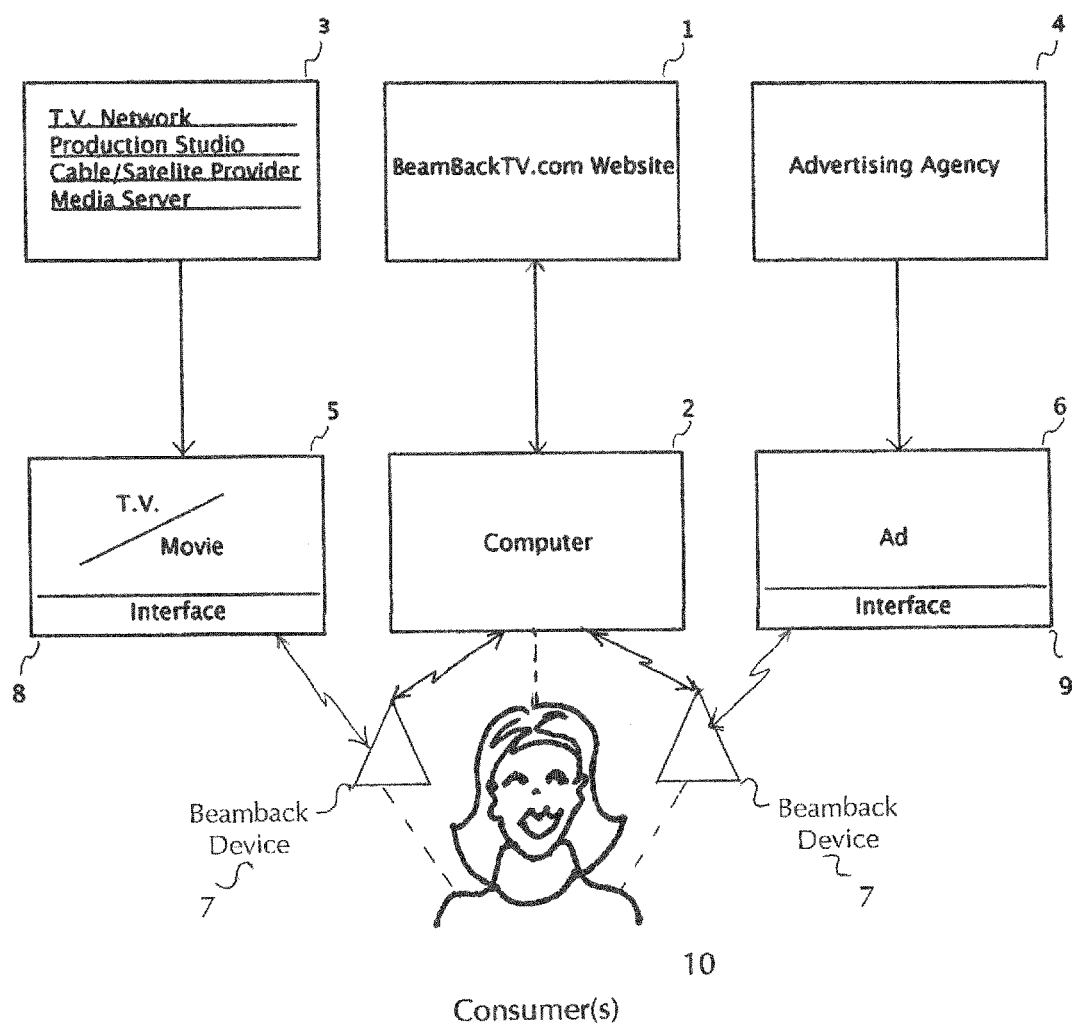
FIG. 1 is an illustration of an apparatus through which products displayed in media programs can be identified and later purchased by consumers, according to an embodiment of the present invention.

Referring now to FIG. 1, a "BeamBack" website 1 stores all products and information about the products placed and/or shown in television programs, movies, or print advertisements and displays such products and information through a computer 2 or other appropriate communication means. Television Networks and/or Production Studios 3 and/or Advertising Agencies 4 work in conjunction and coordinate with the "BeamBack" website 1 regarding the products and placement of those products in the television programs, movies, or print advertisements. A Consumer 10 can view such product placement, for example, in television programs through a television 5, and in print media through advertisements 6. It is to be understood, of course, that products can be viewed and/or displayed in any form of media, including for instance, movies, shows, radio, etc.

The Consumers 10 utilize a "BeamBack" device 7 to express interest in the placed product through an interface 8 or interface 9. For example, upon activation the "BeamBack" device 7 sends a signal to the appropriate interface 8 or 9. Preferably the "BeamBack" device 7 is a signal transmitter, operated for instance by push button or swiping, that the Consumer 10 utilizes while viewing a television program, film or poster. This sending device can be a component of a television remote control unit, cellular telephone, personal digital assistant, car key fob, a device connected to an iPod/MP3 player, or a computer program (e.g., a media player or on a web site). The Interface 8 can be a cable or satellite box, or a stand-alone device that understands what channel the TV or cable box is on, while interface 9 can be an IR receiver placed on the advertisement display. It is to be understood, of course, that there can be many different embodiments of both the sending device and/or signal transmitter and the receiving interface. Accordingly, by pressing a button on or swiping a sending device it will be possible to "Send, Receive or Exchange" information.

Furthermore, each sending device 7 will have a method of transferring stored codes (described below) to the computer or web-enabled device 2. Such method could be a USB or similar wired connection, an Infrared or Bluetooth wireless connection, or another wireless option. For example, a cell phone may be used for this purpose. Alternately, the signal sent from the receiver unit 8 or 9 could, at the user's request, send both an infrared and Radio signal such as "Bluetooth" at the same time. This way the user may press a button on the TV remote, but the return signal from the interface will be sent to a device of choice, such as the user's computer 2 or web-site 1 account rather than to the device 7. In this fashion, the sending device 7 may not need to have a storage capacity. By sending the number code directly to a computer 2, there will be no need to later transfer the number code from the device 7.

In addition, to aid in operation of sending and receiving number codes, each device 7 used to send a code to the receiver units 8 or 9 has its own unique I.D. code. This avoids other devices 7 owned by other consumers 10 from receiving unwanted signals. As the receiver unit 8 or 9 sends back the number code to the initiating device 7 (or the consumer's computer 2 or web-site 1 account page), it adds a code the that identifies the signal to the user's sending device 7.

Figure 2:
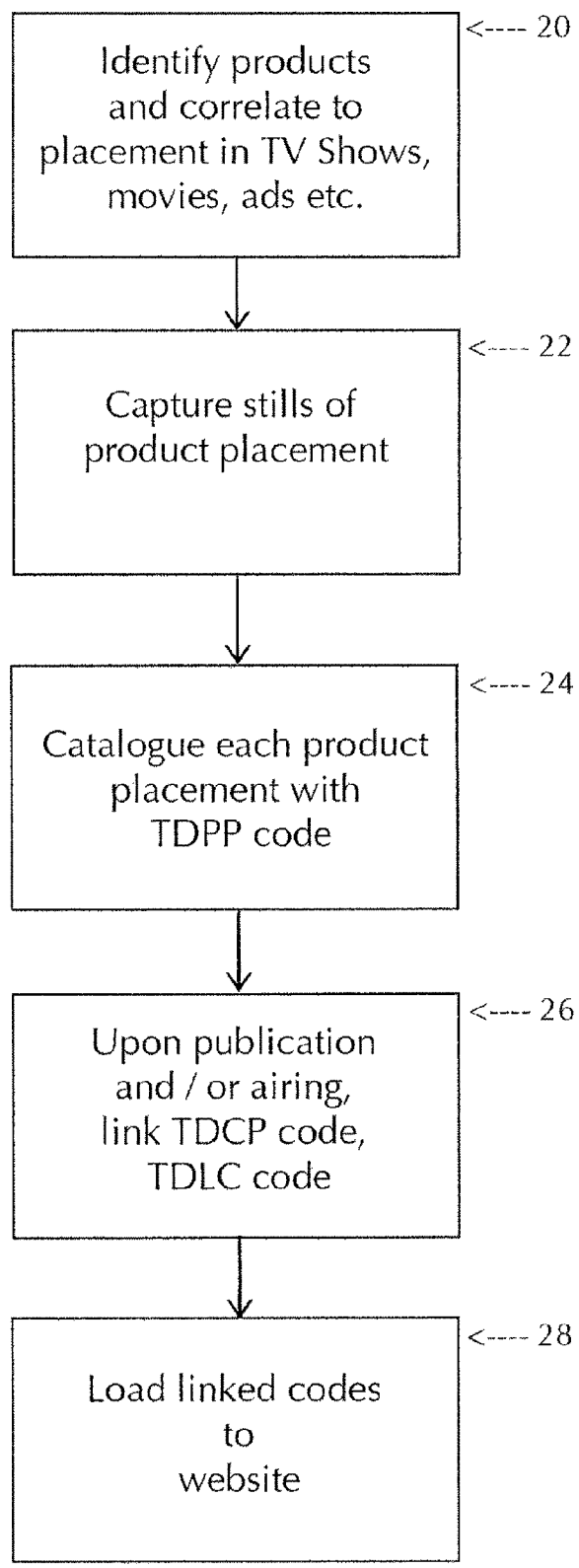
FIG. 2 is an illustration of a flowchart detailing the steps by which products displayed in a media and the product's corresponding information is captured and made available on a website, according to an embodiment of the present invention.

Referring now to FIG. 2, an embodiment of a method by which placed and/or advertised products are identified and made available for consumers is shown. In step 20, products are identified and their appearance in television shows, movies and print advertisements, etc., is correspondingly correlated. Preferably, such correlation between identified products and their appearance is accomplished by the Networks/Studios 3, Agencies 4 and the Web Site 1 working in conjunction. For instance, participating producers, advertisers, prop staff and product placement agencies can provide information about all the products that are in the television program, film or advertisement. In addition, the product manufacturers can provide additional information regarding the products and their features.

Having identified and developed product placement and advertisement, in step 22 still images of all such placed and/or advertised products are captured. Preferably, the stills captured are for every change of camera angle or change in a scene. For example, a new still would be captured when an actor walks into a scene of a program, or if props are changed or added. Thus, a new still is formed when the camera is panned around the scene and new props and or actors come into view. Accordingly, these "screen grabs" from each television program or film or audio broadcast can preferably be captured when the production is edited. Naturally, still images of the products could also correspond to pictures of the product and/or pictures can be taken "off" camera.

The stills displaying the identified products having been captured, in step 24 each still is assigned an identifying marker. Preferably such marker can consist of a Time, Date, Percentage and Production (TDPP) code number. Such TDPP code number, or alternative marker, allows for reference as to between the placed and/or advertised product and the program, movie or advertisement the product is shown in. The time and date can refer to the time and date the still is captured or when the program, movie or advertisement is to run. The percentage figure is for an edited film or television program to denote at what point in the program the still occurs, for instance, as a percentage of the program's overall run time. Thus this percentage code allows for the identification of stills from programs that have been re-edited for other channels or purposes. Accordingly, each and every identified product or item that appears in each still (or poster or store) is catalogued and identified by a TDPP code number whenever it appears in the program or film. It is to be understood, of course, that the broadcasting, displaying, showing or publication of a product can take many forms and naturally corresponds to the physicality's of the visual or audio media in which the product is placed or advertised.

The still images can then be added to the web site 1 as the show is airing, so, for instance, users cannot determine the ending to first-run programs ahead of time. This data can also be accessible through the website for consumers.

In step 26, upon airing and/or publication of the television show, movie or advertisement, the TDPP code number (or other identifying marker) is linked directly to a Time, Date, Channel and Provider (TDCP) code number or a Time, Date, Location and Client (TDLC) code number. The TDCP code number can be utilized when a program or movie is shown via a cable or satellite provider, while the TDLC code number can be utilized for an advertisement displayed by a poster or in a magazine. Alternatively, the TDCP code can also be related to a DVD movie, streamed movies, music, radio and video games, etc., while alternatively the TDLC code can be related to advertisements at kiosks or stores, or for information exchange applications such as swapping, giving and receiving business card information. This same identifying coding technique can be carried though to streaming web content, IPTV, cell phone radio, TV plus, posters, bill boards and in-store content and promotions. It is to be understood, of course, that any other identifying markers or methods may be utilized for the purpose of identifying when and where the identified products are aired, broadcast, shown or placed.

Once the linking between the identifying code numbers (or other identifying marker) is accomplished, in step 28 all of the linked identifying code numbers are transmitted to the "BeamBack" website 1 for storage and later use as described below.

Figure 3:
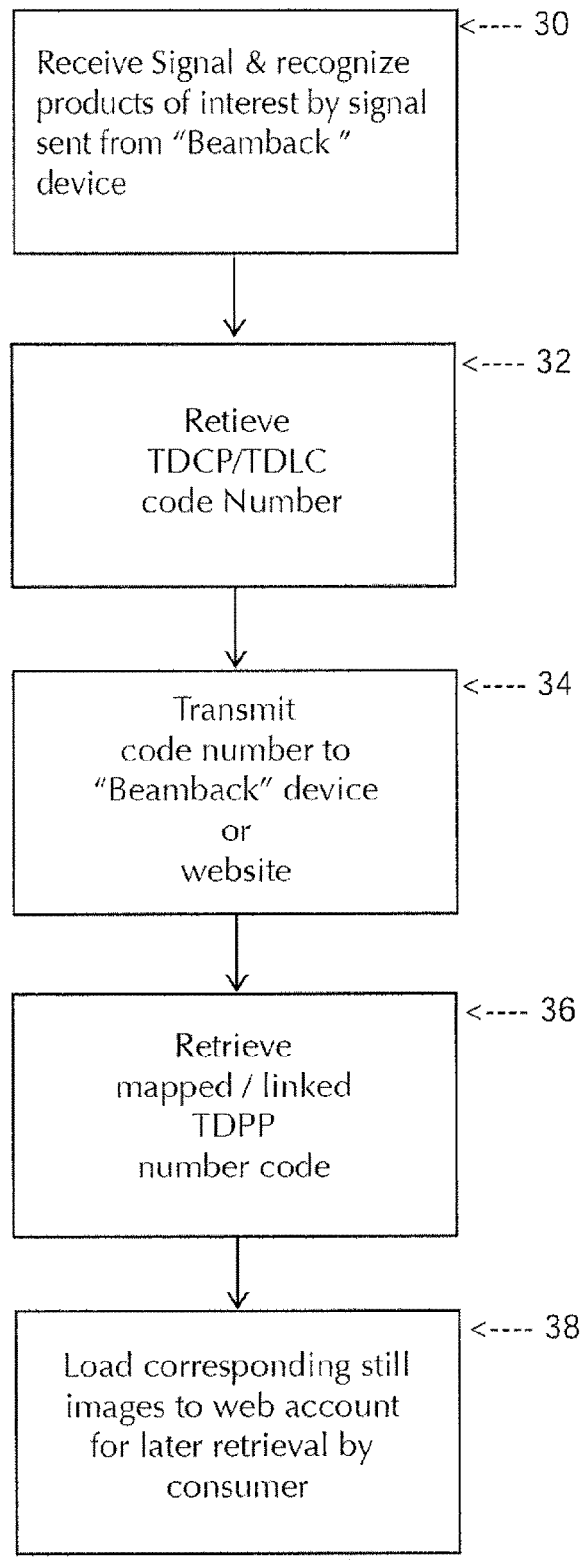
FIG. 3 is an illustration of a flowchart detailing the steps of using a sending device to access information about products from the programs, films, and posters on the system website, according to an embodiment of the present invention.

Referring now to FIG. 3, a method by which a consumer 10 is able to express interest in a placed product by initiating a "screen grab" of the product for possible later purchase is shown. Thus, in step 30, interface 8 or 9, as the case may be, receives a signal transmitted by a "BeamBack" device 7 upon consumer 10 expressing interest during viewing or listening in a placed product in a television show, movie, print advertisement or audio broadcast. Such signal transmission may be initiated by consumer activated push button or the device 7 may contain an RF ID chip or magnetic tape allowing for swiping or the like. In step 32 the interface 8 or 9 recognizes the product interest signal sent by the sending device 7 and retrieves the TDCP or TDLC code number assigned to the television show, movie or print advertisement, and, in step 34, returns that retrieved code number to the device 7. While the identifying code number may be sent to the consumers sending device, it is to be understood that alternatively the code number may be sent directly to the consumer's e-mail address/account, personal web-page or "BeamBack" web-site account. Such alternative embodiment can be accomplished through a cable box or other online wired or wireless device.

In step 34 then, having received a signal from a "BeamBack" device 7 and retrieved a TDCP/TDLC number code corresponding to the product placement the consumer 10 has expressed interest in, the TDPP number code mapped and/or linked to TDCP/TDLC number code is retrieved. As described above, the TDPP number code relates to a still image from a television program, movie or print advertisement, and in step 36 the corresponding still image are loaded to the consumer 10's "BeamBack" web-site account 1. In this manner then, the TDLC and TDCP codes, once transferred from the user's computer or web-enabled device 2 to the web-site 1, will enable the user to navigate to the selected stills for each TV show, film and/or advertisement that had been selected using the sending device. A program will enable a web browser to automatically import the codes so that the user will very easily find the selected stills. Accordingly, the number codes assist/allow the web browser to show the selected "screen grabs" or "captured" images on the consumer's web page.

Accordingly, there are several embodiments by which the consumer 10 can access the placed products displayed on programs, film, or poster. In the preferred embodiment, described above, the consumer 10 can express interest in and find out about products placed in a movie, TV show, DVD, radio, etc., including posters on a phone kiosk, posters in the subway, etc., by utilizing the "BeamBack" device 7 with an interface 8 or 9. In an alternative embodiment, the consumer 10 logs into the "BeamBack" website 1, and chooses a program, film or poster from a menu. The user is then presented with all the still images from that program, film, or poster in thumbnail form.

In another means of accessing the product database, a user can select a program, film or poster from the website menu, and then enter the name of a product or product type, for example, a "watch". The website will search the database of products for all watches displayed on that program, film or poster, and present a list to the user. When the user clicks on an entry in this list, the website will return information about that product, the still images of the scenes in which that product appeared, and a beauty shot of the item. This embodiment gives users the option to look for other products of interest.

Once the consumer 10 is on the "BeamBack" website 1, the user can click on any still image from any program. As the user clicks a thumbnail image, that will produce a larger main image of the still. Then by moving the mouse over that main image of the still, each displayed placed product and/or item in the still is highlighted and information is presented about that product or item. When the user clicks on that item, more information is presented, and the user is given the opportunity to add it to a shopping cart, add it to a wish list, or hold the information for later use, as well as other possible options.

There are yet additional features which are possible using the method and apparatus of the present invention. For instance, if a particular product shown on the program, film or poster is out of date, the product database will have information about the model that is shown in the movie or program, as well as details on the newest similar model. By maintaining this link, as fashion and technology products especially change rapidly, the newest version of any product is always available on the website. Also, for instance, the "BeamBack" web-site can offer the consumer additional choices of like products, all products shown in the media, and allow for searching of product stills near to what the consumer expressed interest in by offering backwards/forwards searching and site-to-site (e.g., in the instance of T.V. shows and subway posters respectively). Again, for instance, the "BeamBack" site can allow for ordering of product not only on-line, but by phone or by offering purchase locations near to the consumer.

Figure 4:
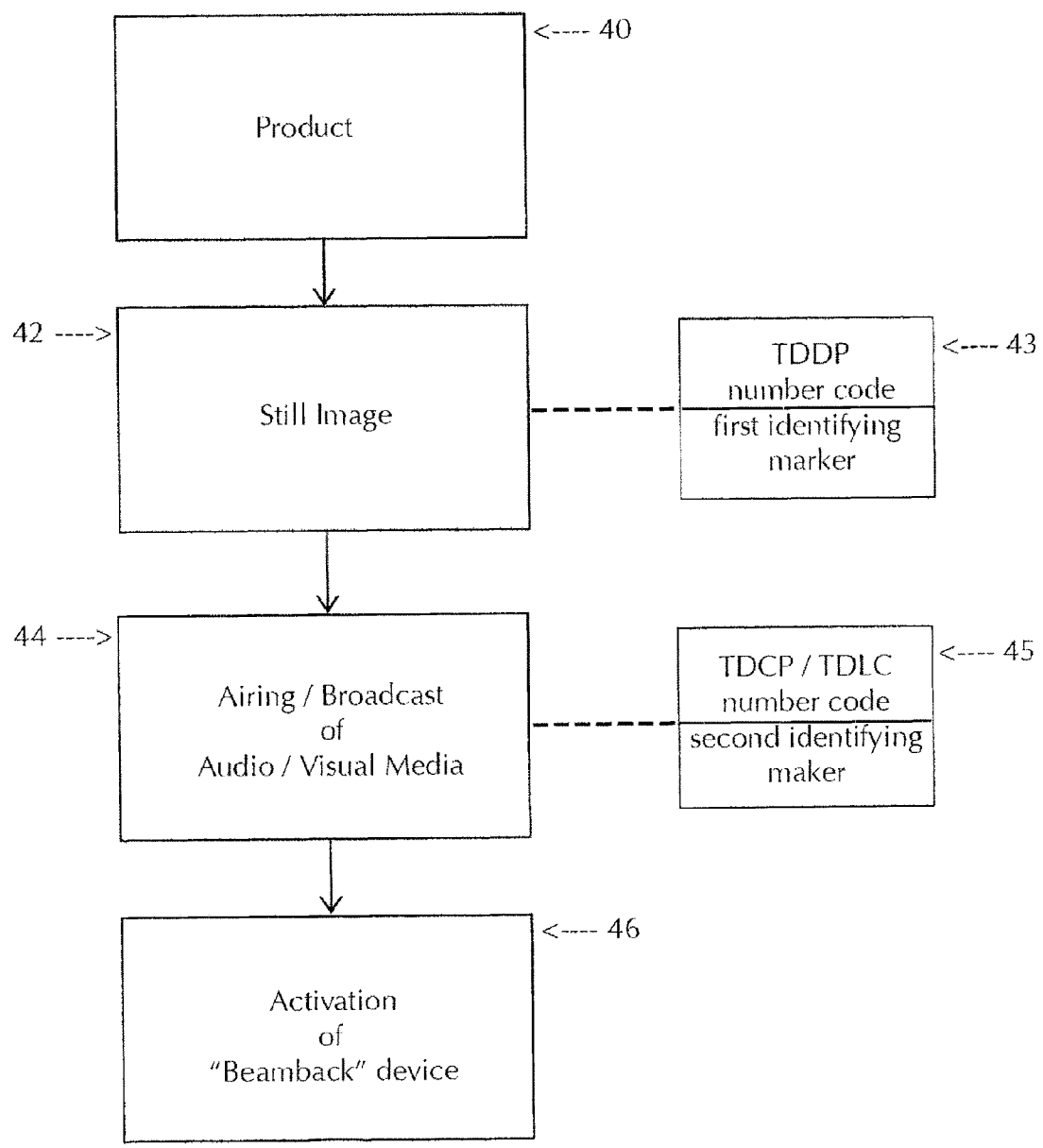
FIG. 4 is an illustration of a depiction of the correlation between components utilized in the method and apparatus of making a product publicized in a visual or audio media available to a consumer for purchase via a web-site, according to an embodiment of the present invention.

Referring now to FIG. 4, the relationship between various components of the method and apparatus of present invention are depicted. That is, a publicized product 40 is captured in a still image 42. As disclosed above, a TDPP number code (or first identifying marker) 43 is utilized to correlate the still image 42 to the product 40 and/or the visual or audio media in which the product is publicized. Likewise as also disclosed above, a TDCP or TDLC number code (or second identifying maker) 45 is utilized to correlate the airing/broadcast of the audio or visual media 44 to the still image 42. Activation of the "BeamBack" device 7 allows for retrieval and purchase of the product 40 through the "BeamBack" web-site 1.

Thus, the present invention enables the user to identify any product or item seen or heard in any visual or audio media, and later make a purchase via the internet of that product or item. Such a method and apparatus greatly enhances the utility of product placement.

In addition, there are many embodiments to extend the usefulness of the method of sending and retrieving data via the present invention. For instance, by using the sending device 7 in a store or restaurant or other business, the user could get store information without picking up a business card or leaflet, or request information from a store even if the store was closed. Alternately, the user could subscribe to an email list for that store or could give shipping information to a carrier or contact data to a business, for example, the service department. Additionally, the user can exchange contact information with friends and business contacts.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method of making a product publicized in a visual media available to a consumer for purchase via a web-site, the method comprising the steps of:
assigning, upon the publication or airing of the visual media, a first identifying marker to a still image corresponding to the product's publication in the visual media to identify at least one publication reference of the visual media in which the product is published;
assigning a second identifying marker to identify the time and place of the publication of the visual media in which the product is published;
receiving, from a "BeamBack" device, a transmission of a signal corresponding to a "screen grab" of the still image of the product in the visual media;
retrieving, in response to the transmission of the signal, the second identifying marker by means of the "BeamBack" device;
linking, upon the publication or airing of the visual media and the retrieval of the second identifying marker by the "BeamBack" device, the first identifying marker and the second identifying marker together to identify the product; and
displaying the identified product on the web-site, wherein the identified product is made available for purchase via the web-site.

2. The method according to claim 1, further comprising the step of:
transmitting at least one of the first and second identifying markers to the web-site.

3. The method according to claim 1, wherein the step of utilizing a still image of the product corresponding to the product's publication in the visual media further comprises at least one of the steps of:
identifying the product;
correlating placement of the product in the visual media; and
capturing a still image of the product.

4. The method according to claim 2, wherein the step of transmitting at least one of the first and second identifying markers to the web-site further comprises at least one of the steps of:
transmitting to at least one of a consumer's computer, web-enabled device and web-page; and
transmitting from at least one of a consumer's computer, web-enabled device and web-page.

5. The method according to claim 1, further comprising the step of:
activating the "BeamBack" device, by at least one of a push button or pass swiping, to initiate retrieval of the second identifying marker.

6. The method according to claim 1, further comprising the step of:
providing a means for purchase of the product via the web-site.

7. An apparatus for making a product publicized in a visual media available to a consumer for purchase via a web-site, the apparatus comprising:
a physical "BeamBack" device configured to transmit a signal corresponding to a "screen grab" of a still image of the publicized product in the visual media; and
an interface configured to receive the signal transmitted by the "BeamBack" device,
wherein a first identifying marker is assigned upon the publication or airing of the visual media to the still image corresponding to the product's publication in the visual media to identify at least one publication reference of the visual media in which the product is published, and a second identifying marker is assigned to identify the time and place of publication of the visual media in which the product is published;
wherein the second identifying marker is assigned upon reception of the signal transmitted by the "BeamBack" device;
wherein the "BeamBack" device is further configured to retrieve the second identifying marker;
wherein upon the publication or airing of the visual media and the subsequent retrieval of the second identifying marker by the "BeamBack" device, the second identifying marker is linked to the first identifying marker to identify the product shown in the still image, and
wherein the product shown in the still image of the publicized product is displayed and made available for purchase on a web-site on the basis of the first and second identifying markers.

8. The apparatus according to claim 7, further comprising:
a means for at least one of video or audio communication of the product.

9. The apparatus according to claim 7, further comprising:
a means for the consumer to purchase the publicized product.

* * * * *